United States Patent

[11] 3,611,105

[72] Inventors Auguste A. Sautel
13 Rue Anatole, Bonneuil-sur-Marne;
Eugene M. Tinture, 34 Avenue Victor
Cresson, Issy-les-Moulineaux, both of
France
[21] Appl. No. 66,184
[22] Filed Aug. 24, 1970
[45] Patented Oct. 5, 1971
[32] Priority Oct. 20, 1969
[33] France
[31] P.V. 69 35909

[54] STABILIZED OUTPUT DIRECT-CURRENT VOLTAGE CONVERTER
4 Claims, 7 Drawing Figs.

[52] U.S. Cl. .................................................. 321/2,
307/240, 321/18, 323/22 T
[51] Int. Cl. .................................................. H02m 3/32
[50] Field of Search ......................................... 315/209
CD; 321/2, 18; 323/22 T; 331/109; 307/240

[56] References Cited
UNITED STATES PATENTS

| | | | |
|---|---|---|---|
| 3,373,334 | 3/1968 | Geisz et al. .................. | 321/18 X |
| 3,375,428 | 3/1968 | Mitchell ........................ | 323/22 SC X |
| 3,376,489 | 4/1968 | Crayton ........................ | 321/18 X |
| 3,522,509 | 4/1970 | Hasenbalg .................... | 321/2 |
| 3,564,393 | 2/1971 | Williamson .................... | 321/2 X |

*Primary Examiner*—William M. Shoop, Jr.
*Attorney*—Abraham A. Saffitz

ABSTRACT: A direct-current voltage converter for converting an unstable voltage into a stable voltage at a floating potential with respect to ground. It comprises means for periodically chopping a current delivered by the source of said unstable voltage, a transformer fed from the chopped current, a rectifier connected to the output circuit of the transformer and delivering a rectified voltage, a circuit including a Zener diode and supplying a reference voltage, means for comparing said reference voltage with said rectifier voltage and delivering an error signal, and means for time modulating said chopped current by said error signal.

INVENTORS:
Auguste A. SAUTEL
and Eugene M. TINTURE

By Abraham A. Saffitz
ATTORNEY

STABILIZED OUTPUT DIRECT-CURRENT VOLTAGE CONVERTER

This invention relates to a DC voltage converter converting an unstable feed DC voltage into a stable output DC voltage.

Basically, the converter comprises an inverter followed by a detector which converts a feed DC voltage having a definite value to ground into a floating DC voltage of a different value, and an output voltage regulator. The inverter and rectifier device comprises a transistor which operates in saturated/cutoff conditions and chops the current from the unstable feed source, a transformer for altering the voltage of the chopped current, and a rectifier for the transformed current. The regulator compares a first voltage, which is derived from the feed DC voltage and which is of appropriately reduced amplitude, with a second voltage, which is proportional to the output voltage but which has a definite value with respect to ground, whereas the output voltage floats. The comparison of the two voltages results in an error signal which time modulates the chopping pulse output of a multivibrator. The time-modulated pulses are applied to the feed current chopping transistor.

The circuit which converts the floating output voltage into an equal voltage having a definite value to ground is itself an inverter and rectifier device whose transformer has a transformation ratio of unity and whose chopping transistor is controlled by the same multivibrator as the converter according to the invention. The conversion circuit of the regulator will hereinafter be called the decoupling circuit.

The output terminals of the converter according to the invention are isolated from ground, so that the converter can supply electrical systems whose structures are symmetrical to ground and electrical systems whose structures are asymmetrical thereto and which have to be supplied by generators whose grounded poles are of opposite sign to the sign of the unstable generator.

The converter according to the invention is very useful for obtaining a smaller stable voltage than the voltage of the unstable generator by matching the transformation ratio of the converter transformer to the required output voltage from the converter, because using a transformer having a transformation ratio of unity enables a large primary current to be switched, whereas using a transformer having a transformation ratio of less than unity limits the switched current of the primary winding while matching the voltage at the secondary winding output to the stable voltage output from the converter.

A description will be given hereinafter by way of nonlimitative example of a converter using a transformer which provides a four-fold voltage reduction and which can deliver 6 amperes at a constant 5 volts, the two converter output terminals being insulated from ground.

The invention will be better understood from the following detailed description with reference to the accompanying drawings wherein.

Figure 1:
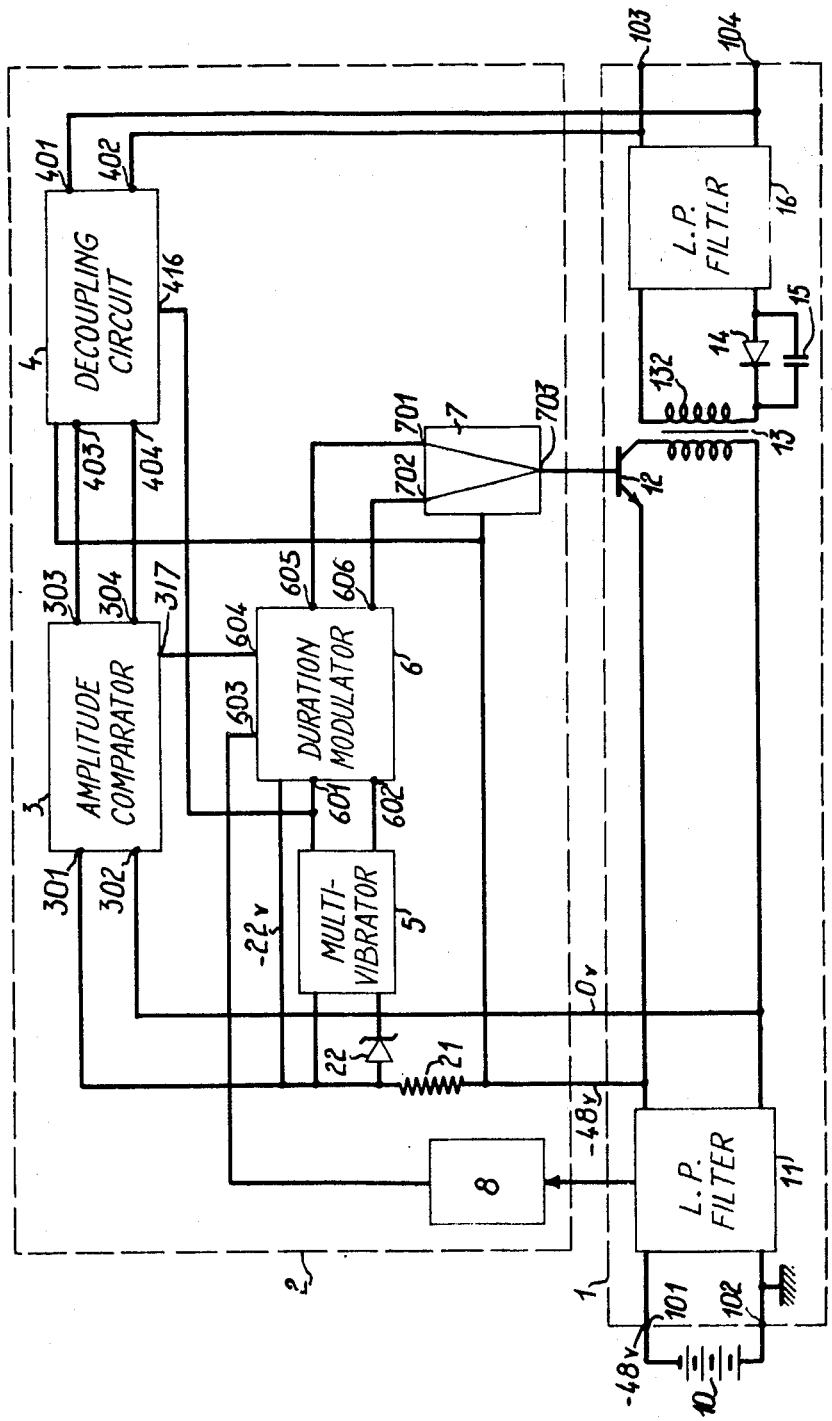
FIG. 1 is a block schematic diagram of the voltage converter according to the invention.

Referring now to FIG. 1, a DC voltage converter comprises a converter proper 1, consisting of an inverter and a detector, and a regulating device 2.

The converter comprises an input DC voltage source 10 connected to terminals 101, 102 and of a voltage, e.g., of 48 volts unstabilized, the positive pole being grounded, a low-pass filter 11, a current-chopping transistor 12, a diode 14 shunted by a capacitor 15 and a low-pass filter 16. A stabilized DC voltage of, e.g., 5 volts is delivered at output terminals 103, 104.

Filter 11 serves to prevent harmonic components produced by current chopping from reaching the source 10 which may be supplying other circuits than the DC voltage converter.

Transistor 12 is a rapid-response power transistor which operates in either of saturated and cutoff conditions and whose emitter-collector path is in series with the 48-volt feedline and whose base is controlled by the regulating circuit 2. Transistor 12 has a chopping frequency of 22 kHz. and must be able to interrupt currents having a 3-ampere peak.

Circuit 2 comprises a decoupling circuit 4 which converts the stabilized DC output voltage at converter output terminals 103, 104, such voltage floating relatively to ground, into a DC voltage of the same value between two terminals, one of which is grounded; circuit 2 also comprises a comparator 3 which compares the amplitude of a voltage derived from the voltage of the DC input voltage source and the DC voltage to ground produced by the circuit 4, a multivibrator 5, a pulse time modulator 6, an amplifier 7 and a protective device 8, amplifier 7 driving the base of chopping transistor 12.

Circuits 3, 5, 6 are supplied at 22 volts derived from the 48 volts via the low-pass filter output through the agency of the voltage divider formed by a resistor 21 and a Zener diode 22.

Amplitude comparator 3 compares a stabilized reference voltage obtained from the unstabilized input voltage with the unstable output voltage of the converter. Of course, these two voltages are not directly comparable, for the reference voltage is, as will be seen hereinafter, produced across a Zener diode having one terminal grounded, whereas the unstable voltage to be stabilized appears across two output terminals, neither of which is grounded.

The unstable 22 volts is applied to the voltage divider formed by a Zener diode 310 and a resistor 311 to produce a stable reference voltage of −5 volts across diode 310. The unstable voltage of −5 volts which it is required to stabilize and which is taken from the output terminals 103, 104 of the converter is applied to terminals 303, 304 through a decoupling circuit 4 which is also merely an inverter followed by a rectifier.

Figure 2:
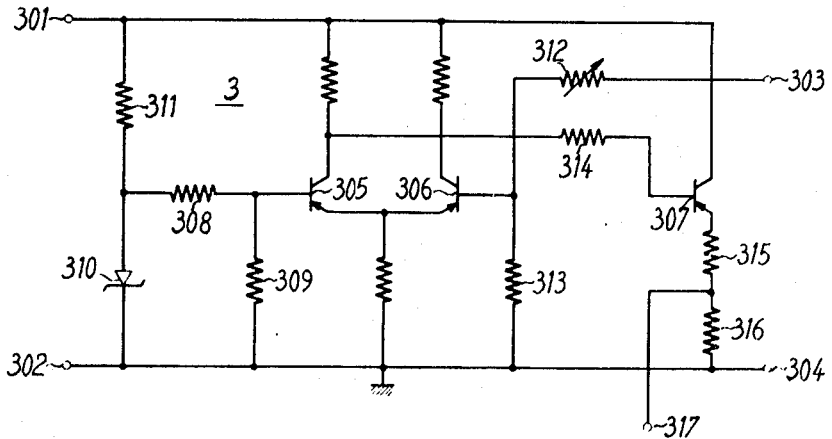
FIG. 2 is the circuit diagram of the amplitude comparator.
Figure 3:
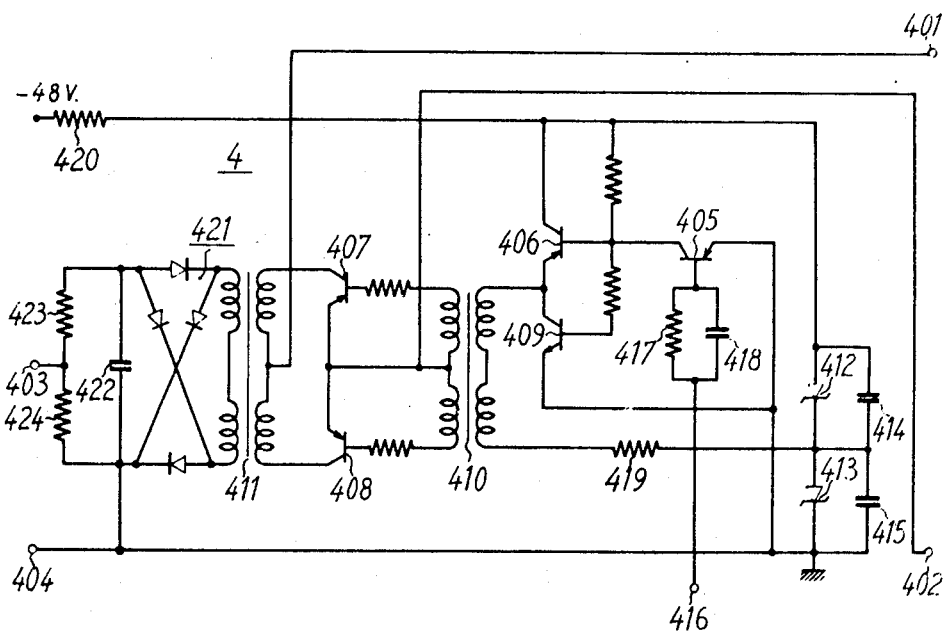
FIG. 3 is the circuit diagram of the decoupling circuit for the DC output voltage.

The amplitude comparator 3 (FIG. 2) comprises two NPN-type transistors 305, 306 arranged as a differential amplifier, and one NPN transistor 307 operating by passing from the saturated to the cutoff condition or conversely.

The reference voltage, which is applied to the base of transistor 305 via voltage divider 308, 309, is derived from the voltage divider formed by the Zener diode 310 and the resistor 311 previously referred to. Because of a slight temperature drift of the Zener diode 310, the reference voltage is taken as 5.1 volts. The unstable voltage obtained by means of the decoupling circuit 4 is applied to the base of transistor 306 via voltage divider 312, 313; resistor 312 is adjustable so that the unstable voltage can be made equal to the reference voltage when the input voltage assumes its normal value.

If the level of the output voltage to be stabilized tends to drop, the potential of the base of transistor 306 decreases and the same tends to cut off, whereas transistor 305 tends toward saturation, with the result that the voltage of the collector of transistor 305 drops, transistor 305 being connected to the base of transistor 307 via resistor 314. When transistor 305 becomes saturated, transistor 307 cuts off, with the result that the potential of the common point to resistors 315, 316, connected in series in the emitter circuit of transistor 307 drops. Such common point is connected to terminal 604 of the time modulator 6.

Decoupling circuit 4 has five transistors; the four transistors 405–408 are of the NPN-type and transistor 402 is of the PNP-type. Circuit 4 also comprises two transformers 410, 411 and two Zener diodes 412, 413 shunted by capacitors 414, 415 respectively.

Circuit 4 is synchronized by multivibrator 5, whose output signals are applied to terminal 416 and therefrom via resistor 417, which is bypassed by capacitor 418, to the base of transistor 405, so that the same saturates and cuts off alternately.

When transistor 405 is cut off, transistor 409 is cut off but transistor 406, which is biased to be conductive, is conductive, so that a negative pulse flows via the primary winding of transformer 410 through transistor 406 and resistor 419, the same applying a bias of +5 volts to the emitter of 406 and to the collector of 409 via the voltage divider consisting of resistor 420 and Zener diodes 412, 413. When transistor 405 is saturated, transistor 406 is nonconductive and transistor 409 is conductive, and a positive pulse is transmitted through the primary winding of transformer 410 via transistor 409 and resistor 419.

Clearly, therefore, the primary winding of transformer 410 is the source of a 22 kHz. pulsating rectangular current. The voltage appearing at the ends of the center-tapped secondary winding of transformer 410 render transistors 407, 408 conductive alternately.

The emitters of transistors 407, 408 are connected to input terminal 402 which is connected to output terminal 103 of converter 1. The collectors of transistors 407, 408 are connected to each of the ends of the primary winding of transformer 411 whose middle point is connected to the other input terminal 401, which is connected to the second output terminal 104 of converter 1.

Consequently, the ground-isolated stabilized voltage output of 5 volts from converter 1 produces in the primary winding of transformer 411 a 22 kHz. AC which produces at the secondary winding terminals voltages which are of constant amplitude proportional to the DC voltage delivered by the converter. The latter voltages are rectified by a rectifier bridge 421 and filtered by capacitor 422 before being applied, via voltage divider 423, 424, to terminal 403 and thence to the base of transistor 306 of amplitude comparator 3.

The circuit 4 has the advantage of operating immediately the multivibrator 5 starts even though the stabilized voltage output from converter 1 has still not reached its rated value.

Terminals 601, 602 of the pulse time modulator 6 are connected to the output terminals of multivibrator 5 which continuously generates a train of 22 kHz. square pulses.

The error signal from comparator 3 is applied to terminal 604. The pulse train, time modulated by the error signal, is outputted via terminals 605, 606 which are connected to input terminals 701, 702 of an amplifier 7 whose output is connected to the base of a switching transistor 12.

Modulator 6 has four NPN-type transistors 607–610. The square pulses from multivibrator 5 are converted into sawtooth signals (lines $a$, $b$ in FIG. 5) by a resistor-capacitor circuit 611–612, and the sawtooth signals are applied to the base of transistor 607, then collected at the collector thereof for amplification by transistor 608, the amplified signals then going through the series-connected resistor 613 and diode 614, which connect the emitter of transistor 608 to the base of transistor 609. The potential of the emitter of transistor 607 depends on the state of transistor 307 of amplitude comparator 3 (FIGS. 2 and 4) which outputs to resistor 616 of the emitter circuit of transistor 607. When transistor 307 is nonconductive, the emitter potential of transistor 607 is virtually zero; such potential increases as transistor 307 tends towards saturation. Consequently, the level of the sawtooth voltage applied to the base of transistor 609 depends upon the state of the transistor 307. Also, since the threshold of conduction of transistor 609 is fixed and determined by the residual forward voltages of the base of transistor 609 and of diode 614, the pulse collected at the collector of transistor 609 varies in duration according to the level of the sawtooth voltage at the base of transistor 609. Transistor 610 reverses the width of the output signal of 609 (FIG. 5, lines $c, d, e, f$).

Figure 5:
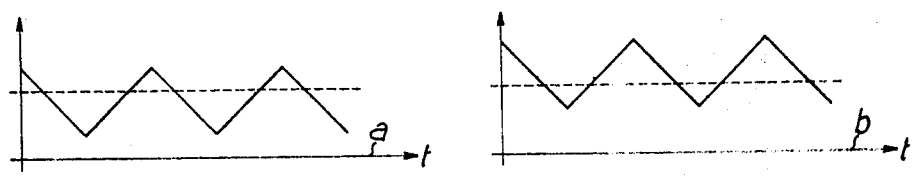
FIG. 5 is a signal diagram explaining the operation of the device shown in FIG. 4.
Figure 5:
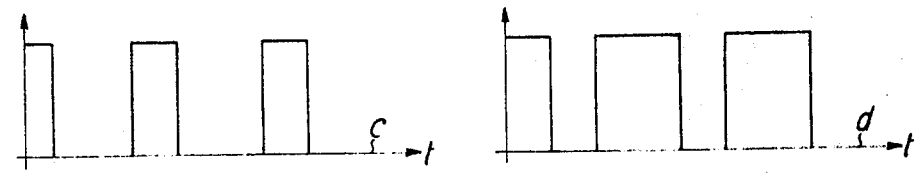
Figure 5:
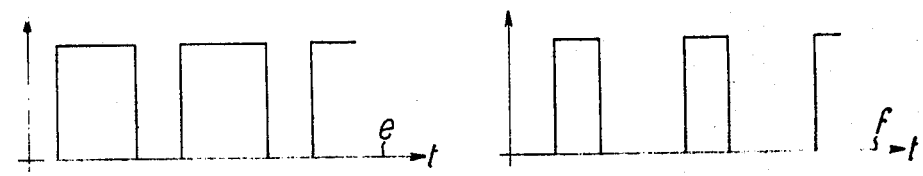

As the diagrams in FIG. 5 show, when the error signal from transistor 307 of comparator 3 is small, the sawtooth signal at the base of transistor 609 is near zero; the pulses collected at the collector of transistor 609 are short, corresponding to long pulses at the collector of transistor 610. The amplifier 7 receives the latter pulses at its input terminals and transmits them cophasally to the switching transistor 12, which thus remains cut off for longer than it is conductive, and vice versa for a large error signal.

Since the threshold of conduction of transistor 609 corresponds to a relatively low voltage, such threshold being determined by the forward residual voltages of transistor 609 and diode 614, such threshold is always below the voltage of the sawtooth peaks; consequently, transistor 609 can be rendered conductive during any time interval in the cycle defined by the 22 kHz. pulse train. Transistor 610 can never become conductive for too long a time interval; if it were, the system would fail to operate satisfactorily.

As will be seen hereinafter, when the protective device 8 operates, it transmits a signal to modulator 6 via terminal 603 to keep transistor 610 cut off, so that no pulse is applied to the base of transistor 12.

Figure 6:
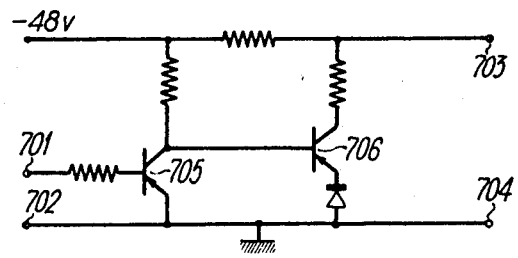
FIG. 6 is the circuit diagram of the amplifier which amplifies the chopping control signals.
Figure 7:
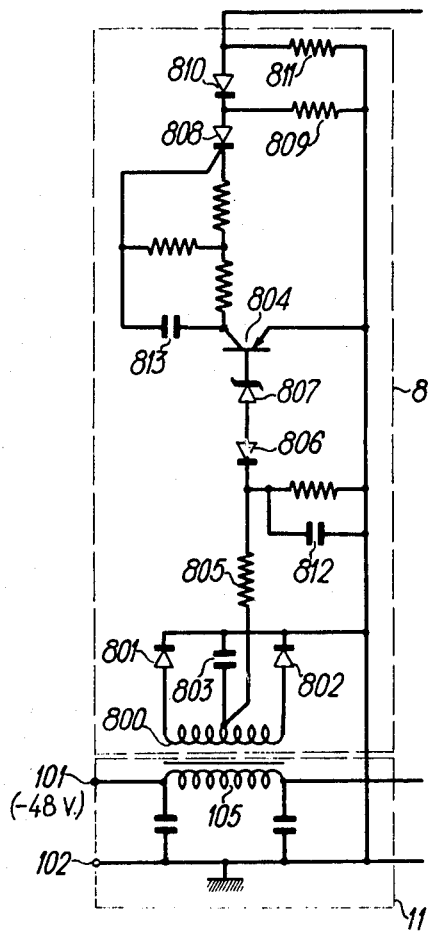
FIG. 7 is the circuit diagram of a protection device which operates as a circuit breaker in the event of overload of the converter.

The circuit arrangement for the amplifier 7 receiving the modulated signals from modulator 6 to alter the state of the power transistor 12 is simple and comprises, as shown in FIG. 6, two transistors 705, 706 connected to form a current amplifier.

The pulses collected at the collector of transistor 610 of modulator 6 are amplified and inverted by transistor 705, then further amplified and inverted by transistor 706 so that, as previously stated, the pulses delivered at terminal 703 which is connected to the base of transistor 12 are in phase with the pulses delivered by modulator 6.

In conclusion, a description will be given of the protective device 8.

Before this description, it should be pointed out that the system formed by the switch 12 and transformer 13 is protected automatically (FIG. 1).

The secondary winding 132 of transformer 13 is isolated during the opening of switch 12. Also, power consumption is limited to the power which transformer 13 can store for the length of one pulse of maximum length. Consequently, the transistor 12 cannot be damaged even if the output of converter 1 is short-circuited.

The purpose of the protective device 8 is to cut the converter 1 out of circuit in the event of an overload—which can be determined by adjusting device 8—being reached and then maintained for some time.

Since the current flowing through inductance 105 of input filter 11 is chopped periodically by transistor 12, inductance 105 originates an AC which can produce AC in a secondary winding 800 wound on the magnetic circuit of inductance 105. The latter AC is rectified by diodes 801, 802 and filtered by capacitor 803. This is the DC which is at a relatively high voltage because of the large number of turns of the secondary winding 800, which trips device 8.

Figure 4:
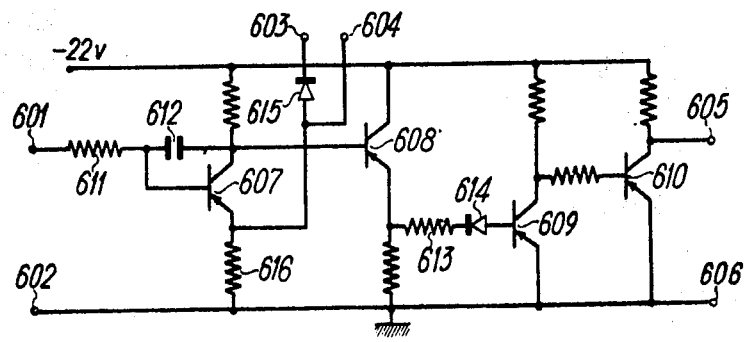
FIG. 4 is a circuit diagram for the pulse time modulator.

The AC voltage collected at the middle point of winding 800 is rectified by diodes 801, 802 and applied to the base of an NPN transistor 804 via resistor 805, diode 806 and Zener diode 807. When such voltage is high enough to open the emitter-base junction of transistor 804, the same saturates and fires thyristor 808, which is held conductive through the agency of resistor 809, across which diode 810 and resistor 811 are connected. The voltage taken from the common point to diode 810 and resistor 811 is applied to the emitter of transistor 607 of modulator 6 through diode 615 (FIG. 4). Consequently, the voltage of the latter emitter and the voltage of the sawtooth signal rises above the threshold of modulator 6. Pulses cease to be transmitted to transistor 12, which remains nonconductive, and so the voltage at converter output terminals 103, 104 drops to zero.

To reset the converter, it must be switched off and on again.

Tripping of device 8 is delayed by capacitor 812, which delays the conduction of transistor 804, and by capacitor 813, which delays the firing of thyristor 808.

A converter according to the invention which proved satisfactory has the performances and characteristics given hereinafter.

The converter was energized by an unstable DC supply U of −48 volts. The stable output voltage was 5 volts (ground isolated). The maximum converter output current was 6 amperes, the amount being limited by the protective device 8.

1. For an input voltage variation of ±15 percent, the output voltage variation is less than 10 millivolts off load and less than 30 millivolts on load.
2. For a load current variation of 3 amperes, the output voltage variation is less than 40 millivolts, and for a 6 amperes variation the output voltage variation is less than 60 millivolts.
3. The output voltage drift with time is less than 25 millivolts at the end of 5 minutes and less than 30 millivolts at the end of 15 minutes.
4. For a temperature variation of the whole converter from 0° to 55° C., the output voltage variation is less than 50 millivolts.
5. Stray currents returned by the converter to the unstable source are less than 150 milliamperes peak-to-peak.
6. Output voltage ripple averages 15 millivolts off load and 25 millivolts on load and has a peak-to-peak values of 30 millivolts off load and 60 millivolts on load.
7. Protection of the adjustable converter is limited deliberately to 7 amperes at a temperature of 25°C.
8. The power efficiency on full load is better than 60 percent, and 65 percent is possible if high quality components and rapid-response transistors and diodes are used.

The power efficiency on half-load is from 55 to 60 percent.

9. The converter can operate satisfactorily at ambient temperatures of up to 60° C.

What is claimed is:

1. A voltage converter for converting an unstable DC input voltage supplied by a source having a ground point into a stabilized DC voltage which floats relatively to ground, comprising a transistor for chopping the current delivered by said source, a transformer fed by the current chopped by said transistor, a rectifier connected in series in the transformer output circuit, a pulse generator and a pulse time modulator whose output drives said chopping transistor, a Zener diode fed by said unstable voltage source and supplying a reference voltage, a decoupling circuit transforming the rectified voltage from said rectifier into a further DC voltage, latter said voltage being equal to said reference voltage when said input voltage is at a predetermined rated value defined relatively to ground, a comparator for comparing said reference voltage with said further DC voltage and delivering an error signal, and means for driving said pulse time modulator by said error signal.

2. A voltage converter according to claim 1, wherein said decoupling circuit comprises a transistor for chopping the rectified transformer output current, latter said transistor being controlled by said pulse generator.

3. A voltage converter according to claim 1 wherein a first low-pass filter is connected between said unstable DC source and said current-chopping transistor, and wherein a second low-pass filter is connected between said rectifier and the output of said converter.

4. A voltage converter according to claim 1, further comprising a second transformer connected in series with said chopping transistor, a rectifier for the current flowing through the secondary winding of said second transformer, a threshold circuit detecting overcurrent in the latter winding, and an OR circuit connected between said pulse time-modulator and, on the one hand, said threshold circuit and, on the other hand, said comparator.